United States Patent [19]

Tamada

[11] Patent Number: 5,255,082
[45] Date of Patent: Oct. 19, 1993

[54] LASER BEAM COLOR IMAGE DISPLAY APPARATUS

[75] Inventor: Sakuya Tamada, Tokyo, Japan

[73] Assignee: Sony Corporation, Japan

[21] Appl. No.: 795,847

[22] Filed: Nov. 21, 1991

[30] Foreign Application Priority Data

Nov. 30, 1990 [JP] Japan .................................. 2-338351

[51] Int. Cl.5 ............................................... H04N 9/31
[52] U.S. Cl. ........................................ 358/60; 353/31; 358/61
[58] Field of Search ..................... 358/60, 61, 62, 63; 340/795, 755, 702; 359/216, 217, 214, 212, 64, 68, 498, 278; 353/31, 34, 30

[56] References Cited

U.S. PATENT DOCUMENTS

| 3,597,536 | 8/1971 | Fowler | 358/63 |
| 3,710,015 | 1/1973 | Fowler | 358/61 |
| 3,783,185 | 1/1974 | Spaulding | 358/61 |
| 3,818,129 | 6/1974 | Yamamoto | 358/60 |
| 4,145,712 | 3/1979 | Spooner et al. | 358/60 |

OTHER PUBLICATIONS

Proceedings of the S.I.D., vol. 12, Nr 2, Second Quarter 1971, pp. 72-76, Schlafer & Al, "A Low Voltage Multiple-Wavelength, Electro-Optic Modulator".
Electronics, pp. 143-146, Jul. 25, 1966, Probing the News, "Toward Large Color Displays:Eliminating Film from the Picture".
IEEE Spectrum, Dec. 1968, pp. 39-50, Baker, "Laser Display Technology".

Primary Examiner—Alvin E. Oberley
Assistant Examiner—Kara Farnandez
Attorney, Agent, or Firm—Ronald P. Kananen

[57] ABSTRACT

A laser beam color image display apparatus includes a single laser beam source for emitting a laser beam from which a plurality of blue, green, and red laser beams are separated, or a plurality of laser beam sources for emitting respective blue, green, and red laser beams. The red laser beam is generated by adding a laser beam having a wavelength of 568.2 nm and a laser beam having a wavelength of 647.1 nm by way of active mixture. The laser beams are modulated in intensity with color signal components, and then deflected by a light scanner, composed of a polygon mirror and a galvanometer mirror to scan a display screen for thereby displaying a color image thereon. The laser beam having the wavelength of 568.2 nm and the laser beam having the wavelength of 647.1 nm are added at an output power ratio of 1:20, with the resultant red laser beam having a wavelength of 612 nm. The single laser beam source may comprise an argon-krypton mixed gas laser, or the laser beam source for emitting the red laser beam may comprise a krypton gas laser.

9 Claims, 9 Drawing Sheets

LASER BEAM COLOR IMAGE DISPLAY APPARATUS

BACKGROUND OF THE INVENTION

1. Field of the Invention

The present invention relates to a laser beam color image display apparatus for controlling laser beams to display a color image on a display screen, and more particularly to a laser beam color image display apparatus for controlling laser beams to display a television color image or the like on a display screen.

2. Description of the Prior Art

Recently, efforts have been directed to the research and development of laser beam color image display apparatus for horizontally and vertically scanning a display screen with intensity-modulated laser beams to display a television color image or the like on the display screen.

Some conventional laser beam color image display apparatus are shown in FIGS. 1, 2, and 3 of the accompanying drawings.

The laser beam color image display apparatus, generally designated by A, shown in FIG. 1, has three laser beam sources, i.e., an argon gas laser beam source 1G for emitting a green laser beam Lg, a krypton gas laser beam source 1R for emitting a red laser beam Lr, and an argon gas laser beam source 1B for emitting a blue laser beam Lb. The laser beam color image display apparatus also includes intensity modulators 2G, 2R, 2B, such for example as acoustooptic intensity modulators, for modulating the intensities of the laser beams from the laser beam sources 1G, 1R, 1B independently of each other, a polygon mirror 3 for deflecting the laser beams horizontally, a galvanometer mirror 4 for deflecting the laser beams vertically, and a projection display screen 5 onto which the laser beams are projected to display a color image thereon.

Lens systems 6, 7 are positioned on both sides of the intensity modulators 2G, 2R, 2B, and lens systems 8, 9 are disposed between the polygon mirror 3 and the galvanometer mirror 4. A reflecting mirror M is positioned to reflect the laser beam that comes from the intensity modulator 2G through the associated lens system 7. Blue- and red-reflecting dichroic mirrors $DM_B$, $DM_R$ are positioned to reflect the laser beams that come from the intensity modulators 2B, 2R, respectively, through the associated lens systems 7.

The green laser beam Lg, which has a wavelength of 514.5 nm, emitted from the argon gas laser beam source 1G is supplied to the intensity modulator 2G, and modulated in intensity with a green signal component Sg of a video signal that is applied to the intensity modulator 2G. The red laser beam Lr, which has a wavelength of 647.1 nm, emitted from the krypton gas laser beam source 1R is supplied to the intensity modulator 2R, and modulated in intensity with a red signal component Sr of the video signal that is applied to the intensity modulator 2R. The blue laser beam Lb, which has a wavelength of 476.5 nm, emitted from the argon gas laser beam source 1B is supplied to the intensity modulator 2B, and modulated in intensity with a blue signal component Sb of the video signal that is applied to the intensity modulator 2R. Actually, the green, red, and blue laser beams Lg, Lr, Lb to be applied to the intensity modulators 2G, 2R, 2B are separated from the laser beams emitted from the laser beam sources 1G, 1R, 1B by respective color separation dichroic mirrors (not shown). The intensity-modulated laser beams Lg, Lr, Lb are then reflected respectively by the reflecting mirror M, the red-reflecting dichroic mirror $DM_R$, and the blue-reflecting dichroic mirror $DM_B$ toward the polygon mirror 3.

The polygon mirror 3 comprises a polygonal mirror 13 that is rotated by an actuator 12. The laser beams are horizontally deflected by the rotating polygonal mirror 13, and applied through the lens systems 8, 9 to the galvanometer mirror 4. The galvanometer mirror 4, which is angularly moved reciprocally by an actuator 14, then deflects the laser beams vertically while projecting them onto the display screen 5. Since the laser beams are deflected horizontally by the polygon mirror 3 and vertically by the galvanometer mirror 4, the laser beams applied to the display screen 5 scan the display screen 5 in a raster mode, displaying a color image on the display screen 5 based on the video signal.

For example, the red laser beam Lr of the wavelength of 647.7 nm is produced with an output power of 2 W, the green laser beam Lg of the wavelength of 514.5 nm is produced with an output power of 0.73 W, and the blue laser beam Lb of the wavelength of 476.5 nm is produced with an output power of 0.87 W. As a result, the raster on the display screen 5 provides the standard illuminant C (white light) of 540 lumens.

FIG. 2 shows another conventional laser beam color image display apparatus, generally designated by B. The laser beam color image display apparatus B has an argon gas laser beam source 16 for emitting green and blue laser beams and a dye laser beam source 17 that is excited by the remaining laser beam produced by the argon laser beam source 16 to emit a red laser beam. The laser beam emitted from the argon gas laser beam source 16 is applied to a blue-reflecting dichroic mirror $DM_{B1}$ which separates blue laser beams Lb having respective wavelengths of 457.9 nm and 476.5 nm. These separated blue laser beams Lb are supplied to an intensity modulator 2B through a lens system 6. The laser beam that has passed through the blue-reflecting dichroic mirror $DM_{B1}$ is then applied to a green-reflecting dichroic mirror $DM_{G1}$ which separates a green laser beam Lg having a wavelength of 514.5 nm. The separated green laser beam is supplied to an intensity modulator 2G through a lens system 6. The remaining laser beam that has passed through the green-reflecting dichroic mirror $DM_{B1}$ is applied to excite the dye laser beam source 17, which then emits a red laser beam Lr having a wavelength of 612 nm that is reflected by a reflecting mirror $M_1$ to an intensity modulator 2R through a lens system 6. The blue, green, and red laser beams Lb, Lg, Lr supplied to the intensity modulators 2B, 2G, 2R are modulated in intensity by blue, green, and red signal components Sb, Sg, Sr of a video signal that are applied respectively to the intensity modulators 2B, 2G, 2R. The intensity-modulated laser beams Lb, Lg, Lr are thereafter applied through respective lens systems 7 to a reflecting mirror $M_2$ and dichroic mirrors $DM_{G2}$, $DM_{B2}$, by which they are reflected to a light deflector that comprises a polygon mirror, lens systems, a galvanometer mirror identical to those shown in FIG. 1. The laser beams are horizontally and vertically deflected by the light deflector to scan a display screen to display a color image thereon.

FIG. 3 shows still another conventional laser beam color image display apparatus, generally designated by C. The laser beam color image display apparatus C has a single argon-krypton mixed gas laser beam source 19 for emitting a laser beam from which blue, green, and red laser beams Lb, Lg, Lr are separated. Those parts shown in FIG. 3 which correspond to those shown in FIGS. 1 and 2 are denoted by corresponding reference characters.

In the laser beam color image display apparatus C, the laser beam emitted from the argon-krypton mixed gas laser beam source 19 is applied to a blue-reflecting dichroic mirror $DM_{B1}$ which separates argon blue laser beams Lb having respective wavelengths of 457.9 nm and 476.5 nm. The laser beam that has passed through the blue-reflecting dichroic mirror $DM_{B1}$ is then applied to a green-reflecting dichroic mirror $DM_{G1}$ which separates an argon green laser beam Lg having a wavelength of 514.5 nm. The remaining laser beam, i.e., a krypton red laser beam Lr having a wavelength of 647.1 nm, that has passed through the green-reflecting dichroic mirror $DM_{G1}$ is reflected by a reflecting mirror $M_1$. The blue, green, and red laser beams Lb, Lg, Lr are then supplied to respective intensity modulators 2B, 2G, 2R by which they are modulated in intensity by blue, green, and red signal components Sb, Sg, Sr of a video signal that are applied respectively to the intensity modulators 2B, 2G, 2R. The intensity-modulated laser beams Lb, Lg, Lr are thereafter applied through respective lens systems 7 to the dichroic mirrors $DM_{G2}$, $DM_{B2}$ and the reflecting mirror $M_2$ by which they are reflected to the polygon mirror 3. The laser beams Lb, Lg, Lr are deflected horizontally by the polygon mirror 3, pass through lens systems 8, 9, and then deflected vertically by the galvanometer mirror 4 to scan the display screen 5 to display a color image thereon.

In the laser beam color image display apparatus shown in FIG. 1, the krypton gas laser beam source 1R cannot produce a red laser beam with a high output power, and the red laser beam Lr of the wavelength of 647.1 nm has a low specific luminosity of 0.12 (see FIG. 4). Therefore, the luminance of the image displayed on the display screen is relatively low and cannot be increased because it is limited by the output power of the red laser beam Lr.

In the laser beam color image display apparatus shown in FIG. 2, since the red laser beam Lr is produced by the dye laser beam source 17 excited by the argon gas laser beam, the image displayed on the display screen is brighter than the image displayed by the laser beam color image display apparatus shown in FIG. 1. More specifically, when the dye laser beam source 17 employs a rhodamine dye as a laser material and is excited by an argon gas laser beam with an output power of 6 W, the dye laser beam source 17 emits a red laser beam having a wavelength of 612 nm with an output power of about 2 W. The red laser beam of the wavelength of 612 nm has a higher specific luminosity of 0.478 (see FIG. 4), which is about four times the specific luminosity of the red laser beam of the wavelength of 647.1 nm. The image displayed on the display screen has a luminance of 650 lumens as a whole. The monochromatic light of the red laser beam of the wavelength of 612 nm is sufficient to cover the red range in the NTSC television system. However, the handling and maintenance of the dye laser beam source 17 is not easy since the laser material is a liquid and has to be circulated as a laminar jet flow within the resonator. Moreover, difficulty has been experienced with dye layers in producing a laser beam in good $TEM_{00}$ mode compared with argon and krypton gas lasers. Laser beams in poor mode conditions give rise to energy loss in intensity modulators. The dye laser beam source 17 requires the exciting laser beam source to have an output power capability of 6 W. Therefore, the laser beam color image display apparatus B shown in FIG. 2 cannot easily be reduced in size. Another problem is that the dye in the dye laser beam source 17 must be cooled in the circulation system for increased service life.

The laser beam color image display apparatus C shown in FIG. 8 also poses limitations on the illuminance of the displayed image because the red laser beam is produced by a krypton gas laser and has a wavelength of 647.1 nm.

OBJECTS AND SUMMARY OF THE INVENTION

In view of the aforesaid problems of the conventional laser beam color image display apparatus, it is an object of the present invention to provide a laser beam color image display apparatus which is capable of displaying color images with a relatively high luminance, has a relatively low electric power requirement, and is relatively small in size.

According to the present invention, there is provided a laser beam color image display apparatus comprising first laser beam generating means for generating a blue laser beam, second laser beam generating means for generating a green laser beam, third laser beam generating means for generating a red laser beam, the third laser beam generating means comprising mixing means for adding a laser beam having a wavelength of 568.2 nm and a laser beam having a wavelength of 647.1 nm by way of active mixture, thereby generating the red laser beam, and scanning means for scanning a display screen with the blue laser beam, the green laser beam, and the red laser beam to display a color image on the display screen.

The mixing means adds the laser beam having the wavelength of 568.2 nm and the laser beam having the wavelength of 647.1 nm at an output power ratio of 1:20. The red laser beam generated by the third laser beam generating means has a wavelength of 612 nm.

The third laser beam generating means comprises an argon-krypton mixed gas laser beam source or a krypton gas laser beam source.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Figure 5:
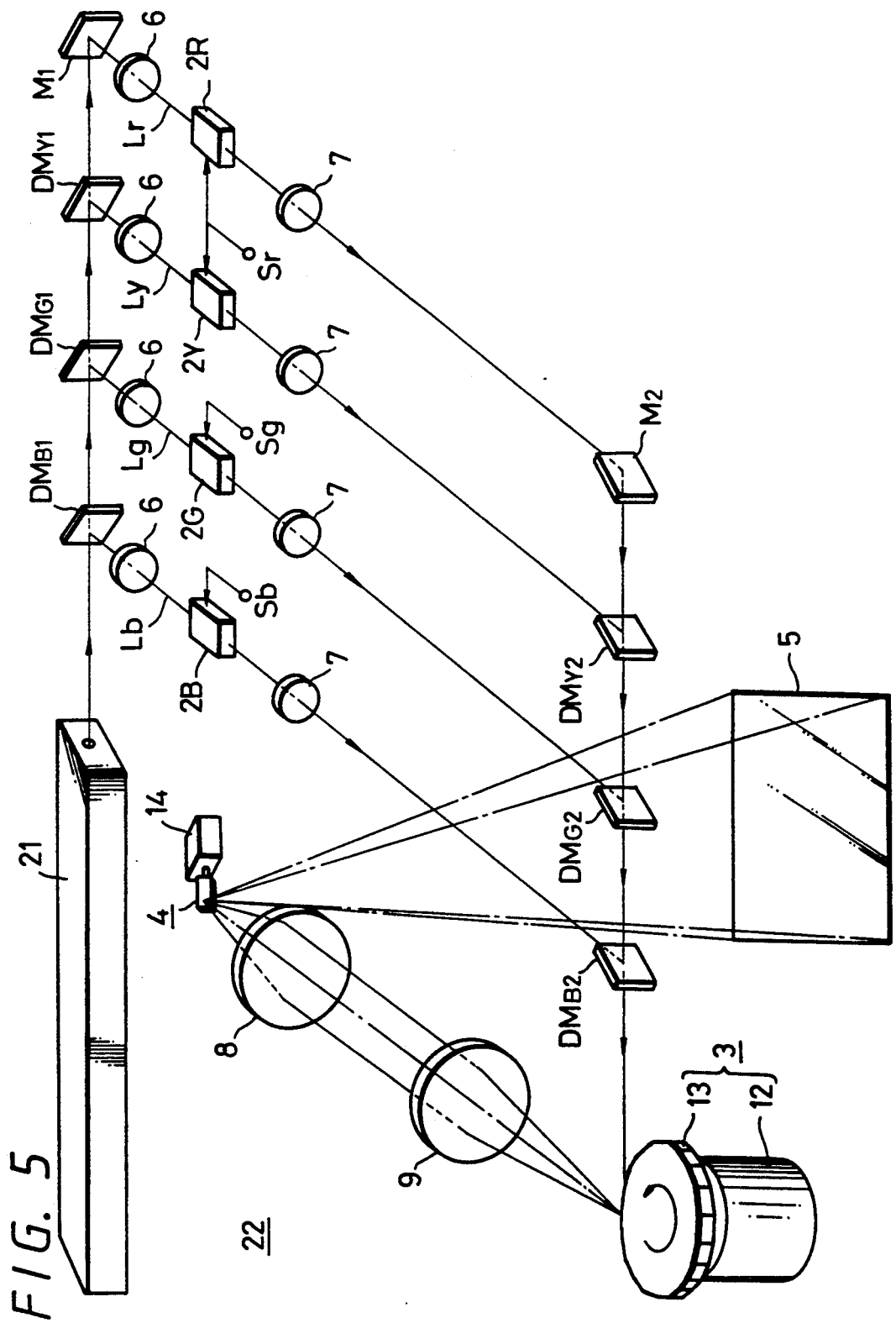
FIG. 5 is a schematic perspective view of a laser beam color image display apparatus according to an embodiment of the present invention.

FIG. 5 shows a laser beam color image display apparatus according to an embodiment of the present invention. The laser beam color image display apparatus, generally designated by 22 in FIG. 5, comprises an argon-krypton mixed gas laser beam source 21 for emitting a laser beam, intensity modulators 2B, 2G, 2Y, 2R such for example as acoustooptic intensity modulators for independently modulating the intensities of blue, green, yellow, and red laser beams separated from the laser beam produced by the argon-krypton mixed gas laser beam source 21, a polygon mirror 3 for horizontally deflecting the intensity-modulated laser beams, the polygon mirror 3 being composed of a polygonal mirror 13 and an actuator 12 for rotating the polygonal mirror 13, a galvanometer mirror 4 for vertically deflecting the laser beams that have been horizontally deflected, and a display screen 5.

The laser beam color image display apparatus 22 also includes blue-reflecting dichroic mirrors $DM_{B1}$, $DM_{B2}$, green-reflecting dichroic mirrors $DM_{G1}$, $DM_{G2}$, yellow-reflecting dichroic mirrors $DM_{Y1}$, $DM_{Y2}$, reflecting mirrors $M_1$, $M_2$, lens systems 6, 7 disposed one on each side of the intensity modulators 2B, 2G, 2Y, 2R, and lens systems 8, 9 disposed between the polygon mirror 3 and the galvanometer mirror 4.

The laser beam emitted from the argon-krypton mixed gas laser beam source 21 is applied to the blue-reflecting dichroic mirror $DM_{B1}$ which separates argon blue laser beams Lb having respective wavelengths of 457.9 nm and 476.5 nm. These separated blue laser beams Lb are supplied to the intensity modulator 2B through the lens system 6, and modulated in intensity with a blue signal component Sb of a video signal that is supplied to the intensity modulator 2B. The laser beam that has passed through the blue-reflecting dichroic mirror $DM_{B1}$ is then applied to the green-reflecting dichroic mirror $DM_{G1}$ which separates an argon green laser beam Lg having a wavelength of 514.5 nm (which may also separate a krypton laser beam having a wavelength of 520.8 nm and an argon laser beam having a wavelength of 528.7 nm). The separated green laser beam Lg is supplied to the intensity modulator 2G through the lens system 6, and modulated in intensity with a green signal component Sg of the video signal that is supplied to the intensity modulator 2G. The laser beam that has passed through the green-reflecting dichroic mirror $DM_{G1}$ is then applied to the yellow-reflecting dichroic mirror $DM_{Y1}$ which separates a krypton yellow laser beam Ly having a wavelength of 568.2 nm. The separated yellow laser beam Ly is supplied to the intensity modulator 2Y through the lens system 6, and modulated in intensity with the red signal component Sr of the video signal that is supplied to the intensity modulator 2Y. The remaining laser beam, i.e., a krypton red laser beam Lr having a wavelength of 647.1 nm, that has passed through the yellow-reflecting dichroic mirror $DM_{Y1}$ is reflected by the reflecting mirror $M_1$ and supplied to the intensity modulator 2R through the lens system 6. The red laser beam Lr is modulated in intensity with a red signal component $S_R$ of the video signal that is supplied to the intensity modulator 2R.

The intensity-modulated laser beams Lb, Lg, Ly, Lr are thereafter applied through the respective lens systems 7 to the dichroic mirrors $DM_{B2}$, $DM_{G2}$, $DM_{Y2}$ and the reflecting mirror $M_2$ by which they are reflected to the polygon mirror 3. The laser beams Lb, Lg, Ly, Lr are horizontally deflected by the rotating polygonal mirror 13, and applied through the lens systems 8, 9 to the galvanometer mirror 4. The galvanometer mirror 4, which is angularly moved reciprocally by the actuator 14, then deflects the laser beams vertically while projecting them onto the display screen 5. Since the laser beams are deflected horizontally by the polygon mirror 3 and vertically by the galvanometer mirror 4, the laser beams applied to the display screen 5 scan the display screen 5 in a raster mode, displaying a color image on the display screen 5 based on the video signal.

In the laser beam color image display apparatus shown in FIG. 5, the yellow laser beam Ly of the wavelength of 568.2 nm and the red laser beam Lr of the wavelength of 647.1 nm are added by way of active mixture by the dichroic mirror $DM_{Y2}$, providing the red light of the displayed image. More specifically, the yellow laser beam Ly of the wavelength of 568.2 nm and the red laser beam Lr of the wavelength of 647.1 nm are added at an output power ratio of 1:20, producing red light which is equivalent to monochromatic light having a wavelength of about 612 nm. The red light thus produced by active mixture has chromaticity coordinates of $x = 0.675$ and $y = 0.3245$. The blue laser beams Lb of the wavelengths of 457.9 nm and 476.5 nm are also added at an output power ratio of 1:2, producing blue light which is equivalent to monochromatic light having a wavelength of about 470 nm. The blue light thus produced has chromaticity coordinates of $x = 0.124$ and $y = 0.066$. The green light produced by the green laser beam Lg has chromaticity coordinates of $x = 0.0364$ and $y = 0.8058$.

Figure 9:
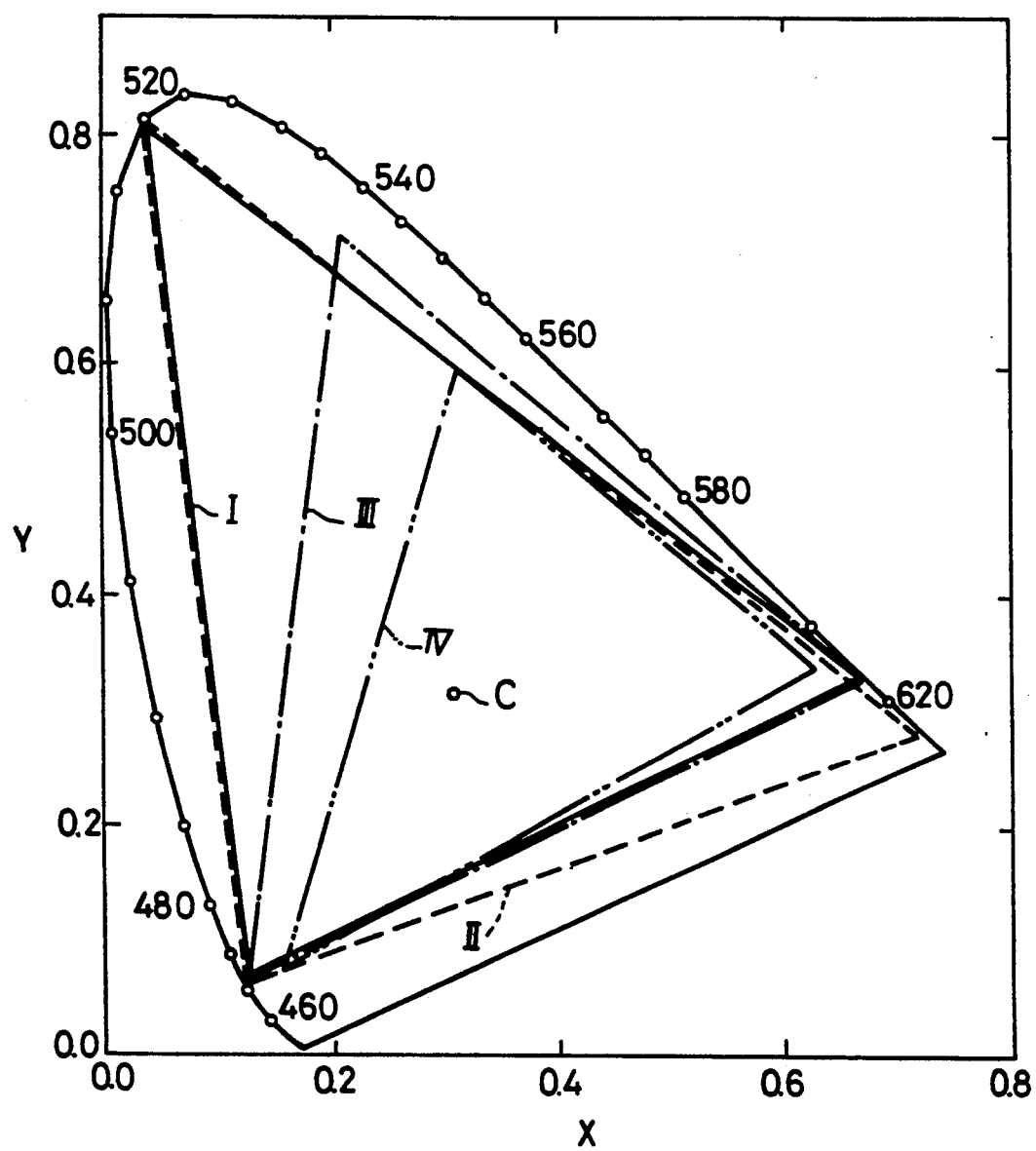
FIG. 9 is a chromaticity diagram showing color ranges of the laser beam color image display apparatus according to the present invention and the conventional laser beam color image display apparatus.

The color range that can be expressed by the laser beam color image display apparatus 22 is shown in the chromaticity diagram of FIG. 9. The solid-line curve I indicates the color range of the laser beam color image display apparatus 22 shown in FIG. 5. The broken-line curve II indicates the color range of the conventional laser beam color image display apparatus C shown in FIG. 3. The dot-and-dash-line curve III shows the color range according to the NTSC standard three primary colors. The two-dot-and-dash-line curve IV shows the color range according to the HDTV (high-definition television) standard primary colors. As can be seen from the chromaticity diagram of FIG. 9, the laser beam color image display apparatus 22 shown in FIG. 5 can cover the color range according to the NTSC standard three primary colors substantially in its entirety, and can cover the color range according to the HDTV standard primary colors (which can substantially be reproduced by the present cathode-ray-tube television system).

Tables 1, 2, and 3, given below, show laser beam output powers at respective wavelengths required to provide the standard illuminant C (white color) of 700 lumens. Table 1 shows laser beam output powers in the conventional laser beam color image display apparatus B shown in FIG. 2 which employs an argon laser beam source and a dye laser beam source. Table 2 shows laser beam output powers in the conventional laser beam color image display apparatus C shown in FIG. 3 which employs an argon-krypton mixed gas laser beam source. Table 3 shows laser beam output powers in the laser beam color image display apparatus 22 shown in FIG. 5 which employs an argon-krypton mixed gas laser beam source. In Table 3, the output power ratio of the argon-krypton mixed gas laser beam source can be optimized by the mixture ratio of argon and krypton gases, the curvature of the mirrors of the resonator, and the reflective coatings.

TABLE 1

Figure 1:
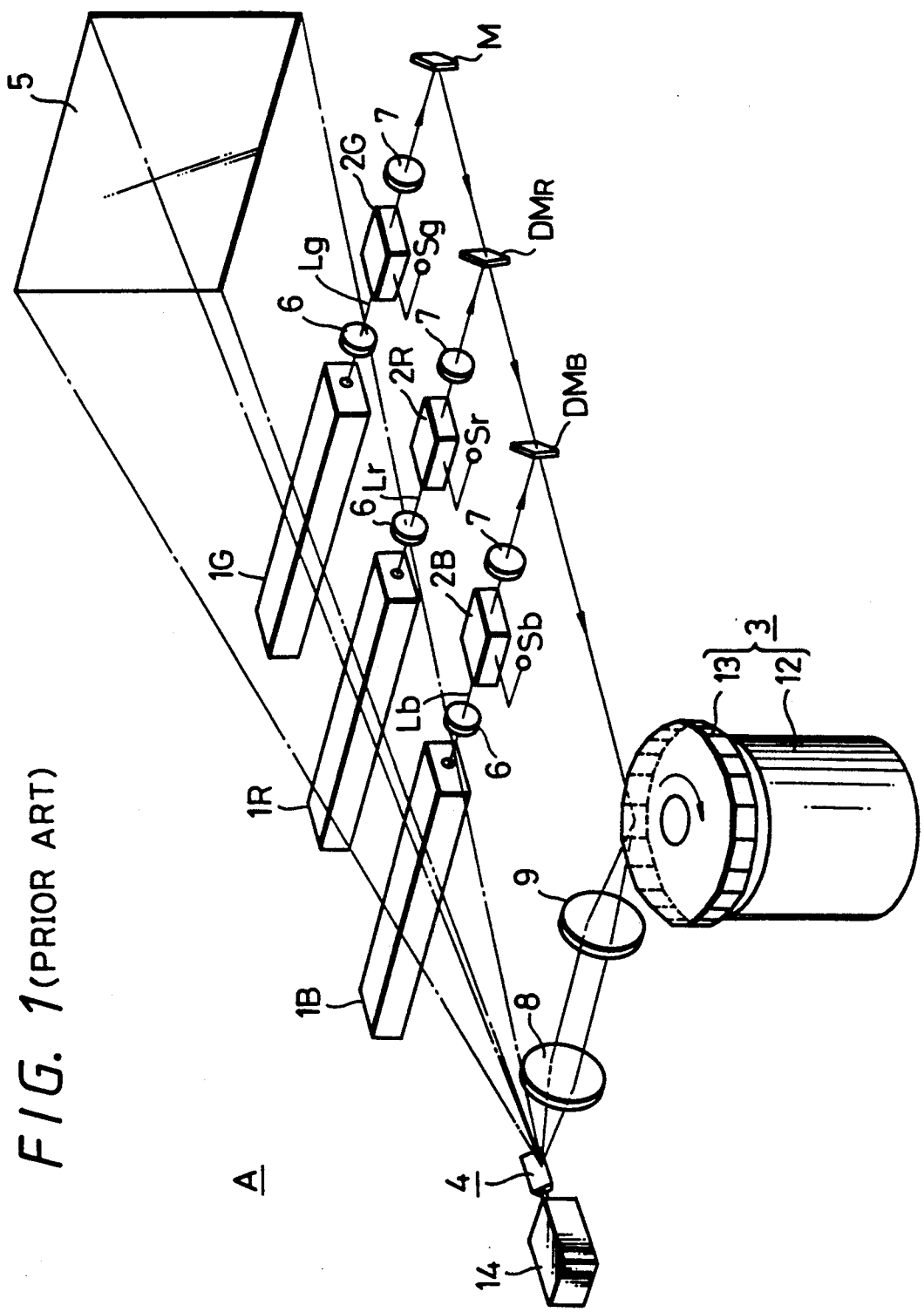
FIG. 1 is a schematic perspective view of a conventional laser beam color image display apparatus.
Figure 2:
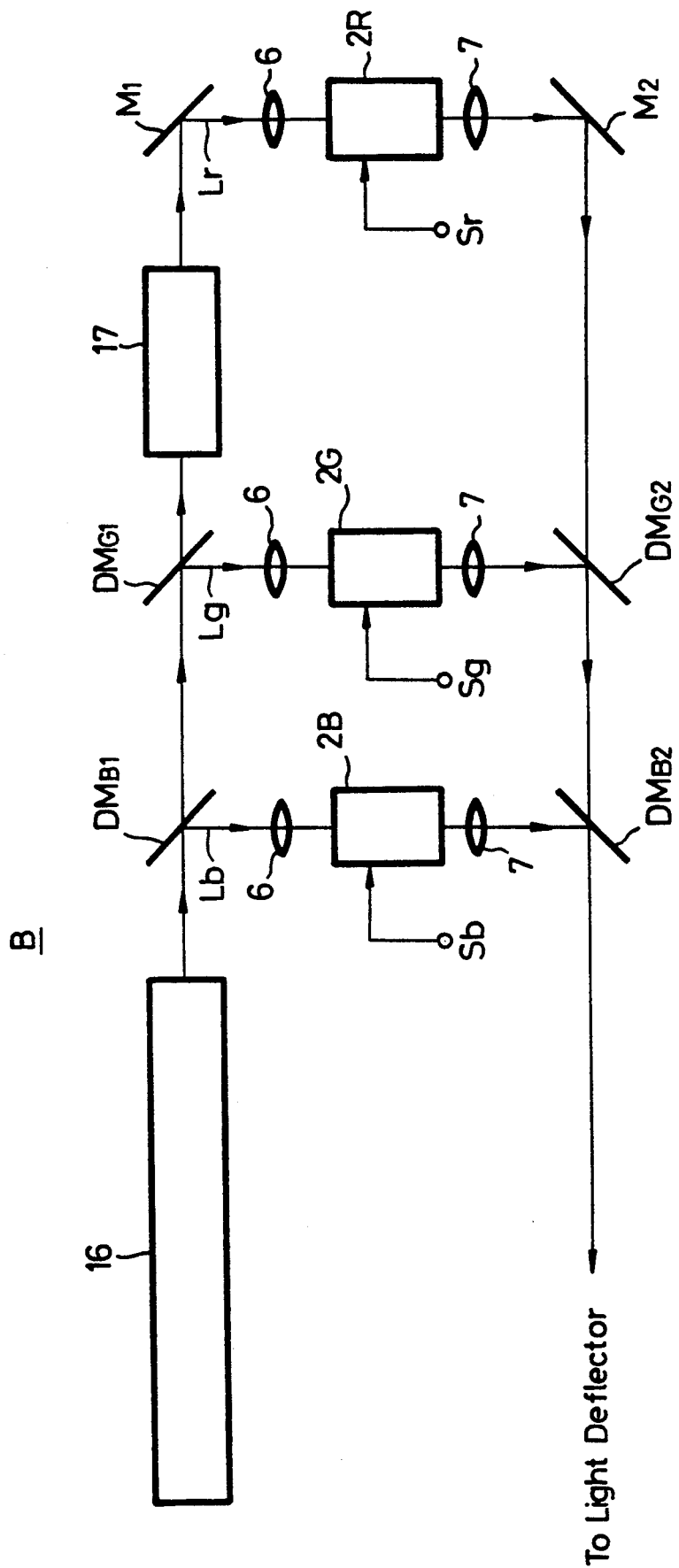
FIG. 2 is a schematic plan view of another conventional laser beam color image display apparatus.

Argon gas laser + dye laser (FIG. 2)

| | COLOR | | | |
|---|---|---|---|---|
| | BLUE | | GREEN | RED |
| WAVELENGTH (nm) | 457.9 | 476.5 | 514.5 | 612 | TOTAL |
| LASER OUTPUT (W) | 0.3 0.9 | 0.6 | 0.9 | 4.2 (Ar laser) 0.84 | 6.0 |
| LUMINOUS FLUX (l m) | 11 60 | 49 | 368 | 274 | 700 |

TABLE 2

Figure 3:
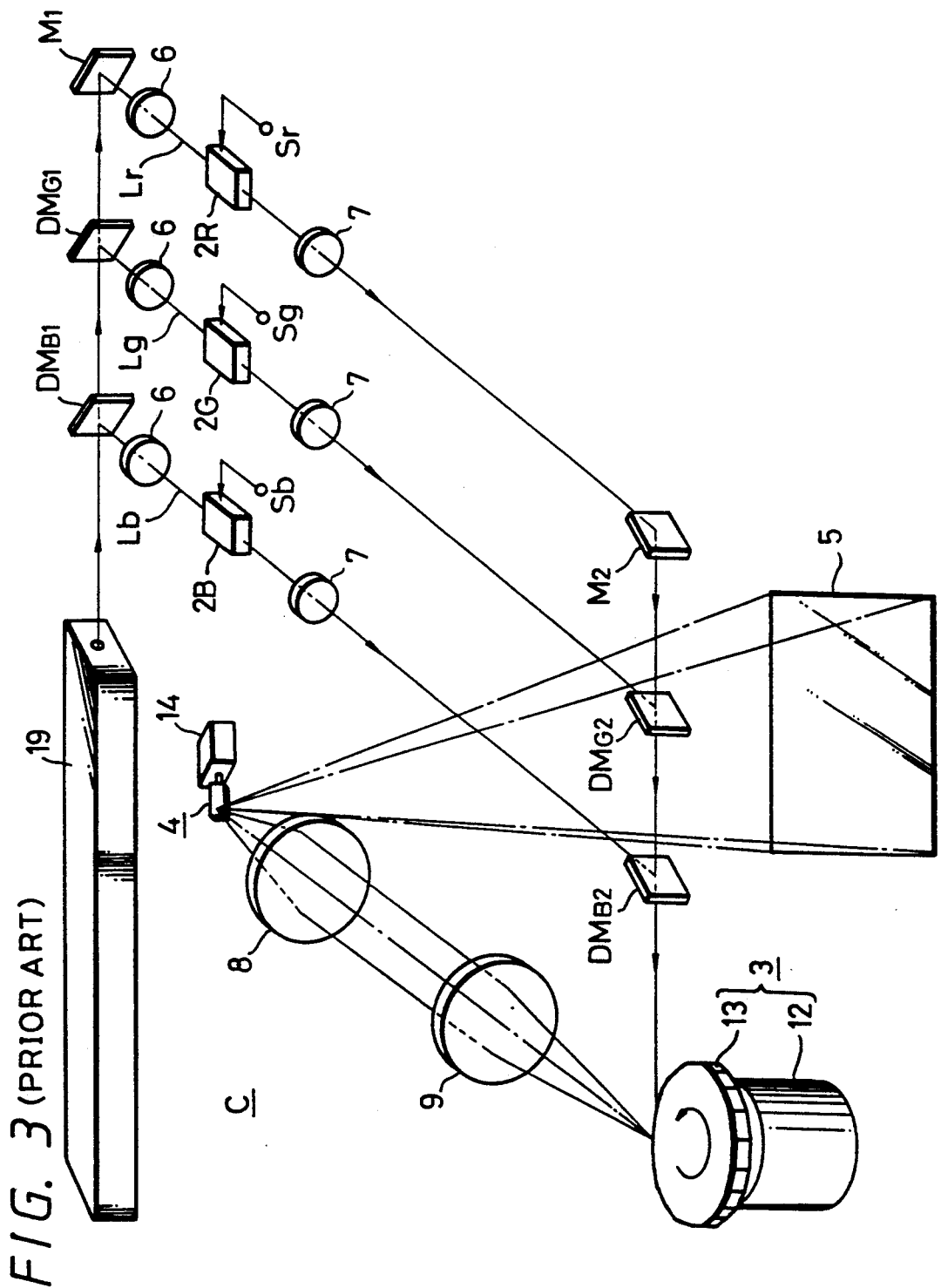
FIG. 3 is a schematic perspective view of still another conventional laser beam color image display apparatus.
Figure 4:
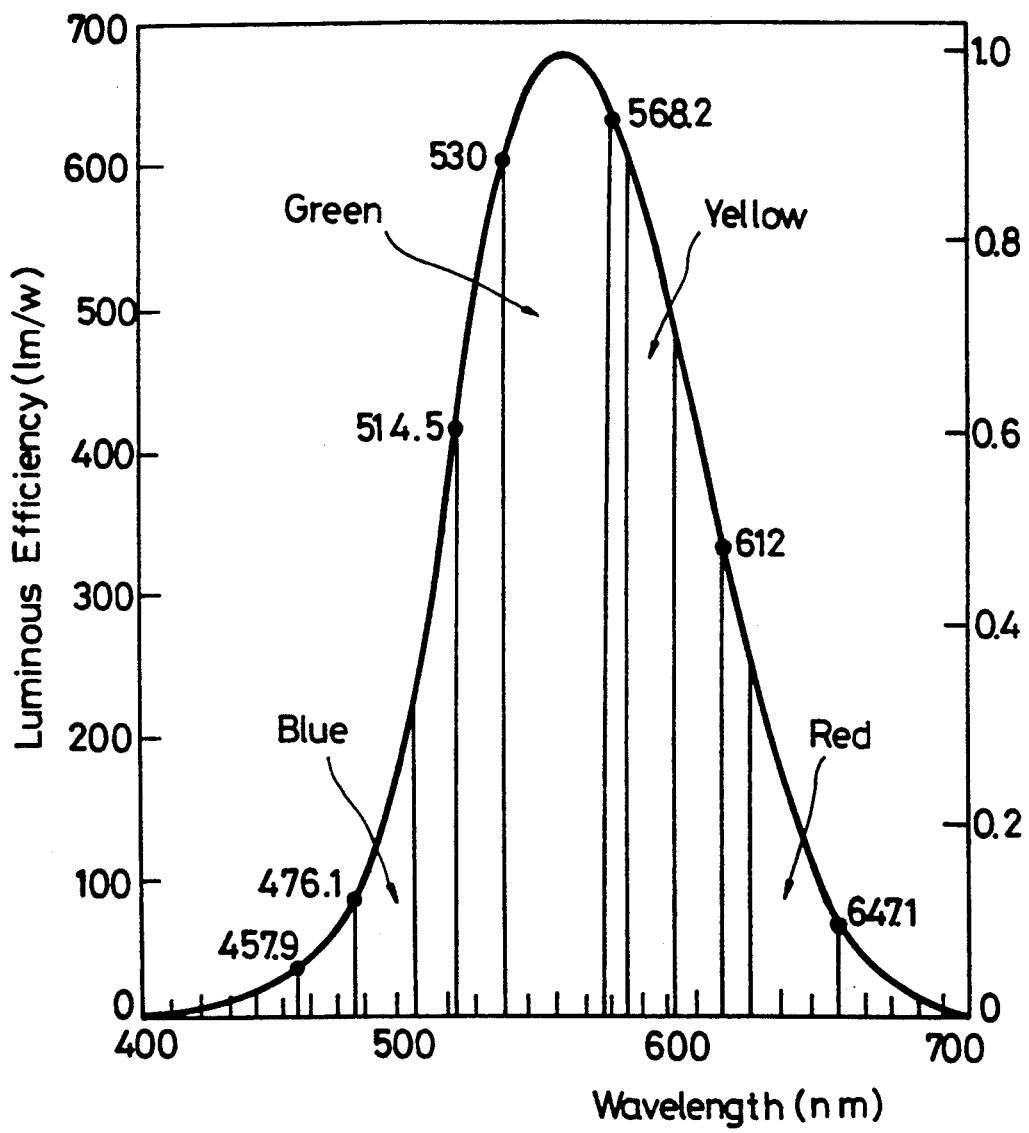
FIG. 4 is a diagram of luminous efficiencies and specific luminosities plotted against wavelengths.

Argon-krypton mixed gas laser (FIG. 3)

| | COLOR | | | |
|---|---|---|---|---|
| | BLUE | | GREEN | RED |
| WAVELENGTH (nm) | 457.9 | 476.5 | 514.5 | 647.1 | TOTAL |
| LASER OUTPUT (W) | 0.3 0.9 | 0.6 | 1.06 | 2.64 | 4.6 |
| LUMINOUS FLUX (l m) | 20.2 60.5 | 40.3 | 430 | 210 | 700 |

TABLE 3

Argon-krypton mixed gas laser (FIG. 5)

| | COLOR | | | |
|---|---|---|---|---|
| | BLUE | | GREEN | RED | |
| WAVELENGTH (nm) | 457.9 | 476.5 | 514.5 | 568.2 | 647.1 | TOTAL |
| LASER OUTPUT (W) | 0.3 0.9 | 0.6 | 0.9 | 0.12 2.42 | 2.3 | 4.2 |
| LUMINOUS FLUX (l m) | 11 60 | 49 | 368 | 79 275 | 196 | 700 |

As is apparent from Tables 2 and 3, the red light produced by the laser beam color image display apparatus according to the present invention has a luminous flux (luminance) that is about 30% greater than that of the red light of the wavelength of 647.1 nm (emitted with the output power of 2.6 W in Table 2). If the same argon-krypton mixed gas laser beam source is employed in Tables 2 and 3, then since the laser beam of the wavelength of 647.1 nm is produced with the output power of 2.3 W, the conventional laser beam color image display apparatus shown in FIG. 3 produces red light having a luminance of 210 lm × (2.3 W/2.64 W) = 183 lm. In the laser beam color image display apparatus according to the present invention, the luminous flux (luminance) of the produced red light increases by (275 lm − 183 lm)/183 lm × 100 = 50%. It can be seen from Tables 1, 2, and 3 that the total laser output power required to obtain the same luminance of 700 lm is smaller with the laser beam color image display apparatus according to the present invention than with the conventional laser beam color image display apparatus. Accordingly, the laser beam color image display apparatus according to the present invention has a lower electric power requirement.

As described above, the laser beam color image display apparatus according to the present invention expresses the red light of the displayed image by adding the krypton laser beam of the wavelength of 568.2 nm and the krypton laser beam of the wavelength of 647.1 nm by way of active mixture. The luminance of the resulting red light is greater by the luminance of the added laser beam of the wavelength of 568.2 nm. In the case where the laser beam color image display apparatus according to the present invention is used as a practical laser beam color image display apparatus for television, it can display color images with greater luminance and has a lower electric power requirement than the conventional laser beam color image display apparatus. The laser beam color image display apparatus according to the present invention requires less maintenance, is smaller in size, and less expensive than the conventional laser beam color image display apparatus which employs dye laser.

Figure 6:
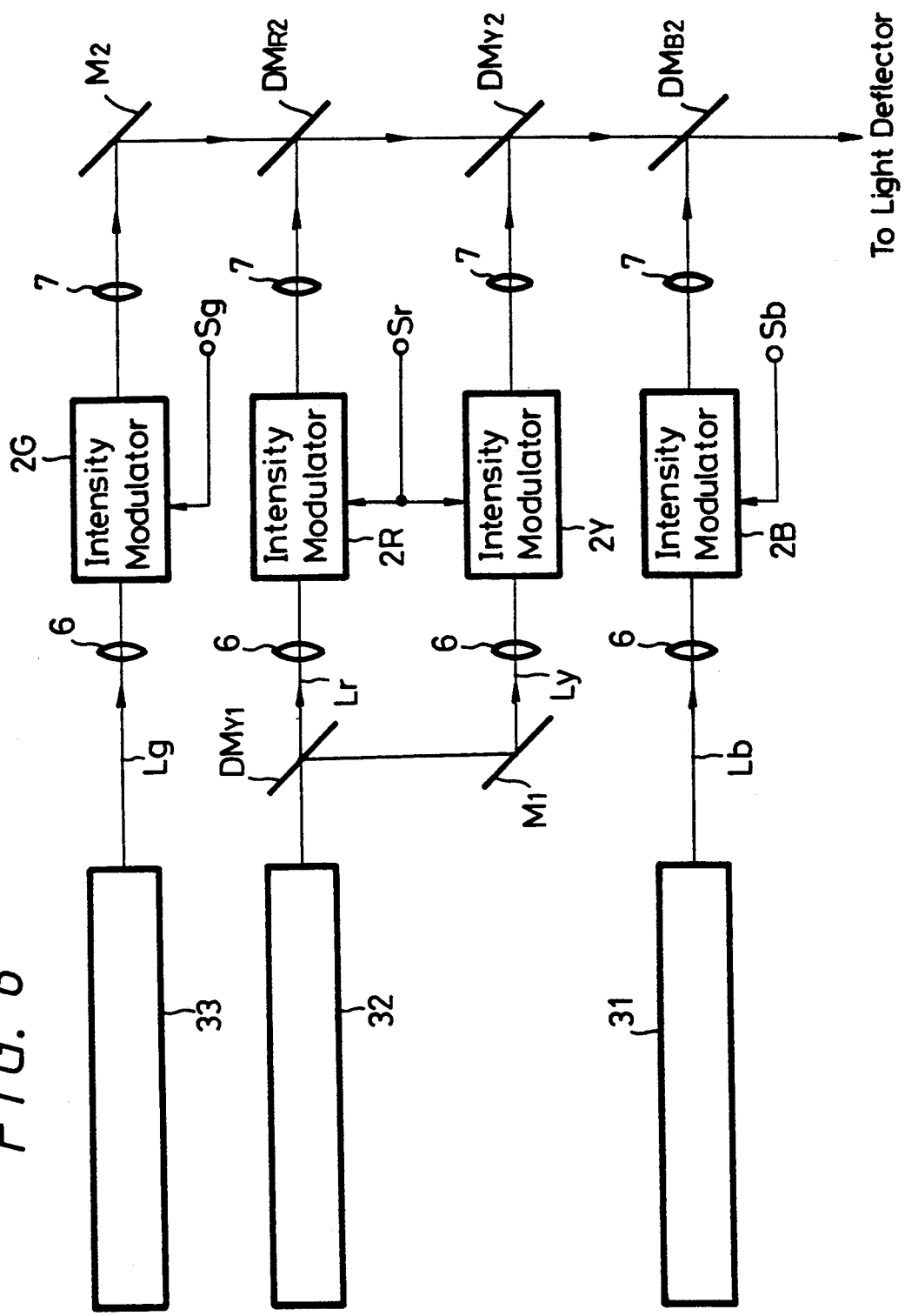
FIG. 6 is a schematic plan view of a laser beam color image display apparatus according to another embodiment of the present invention.
Figure 7:
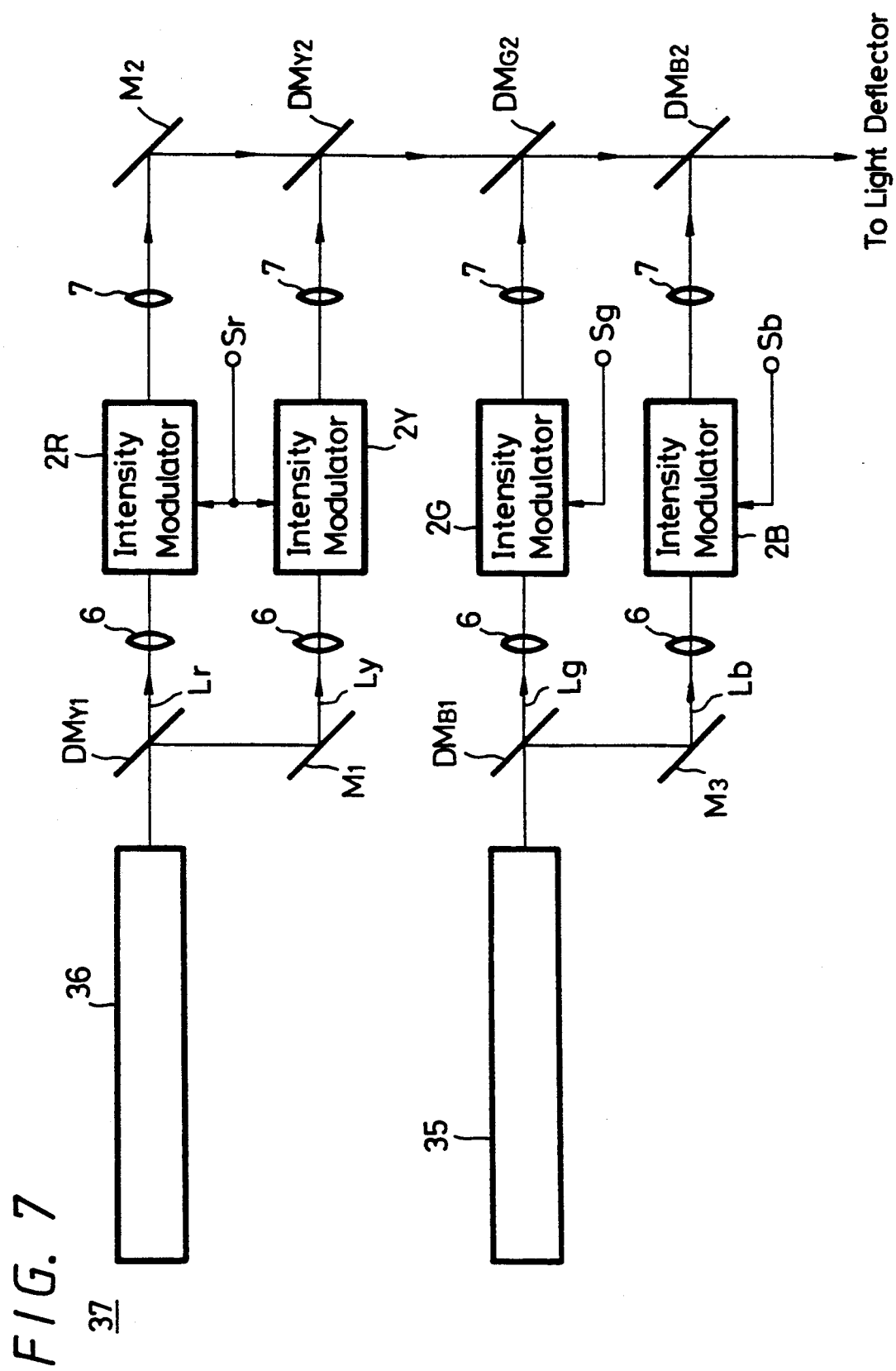
FIG. 7 is a schematic plan view of a laser beam color image display apparatus according to still another embodiment of the present invention.
Figure 8:
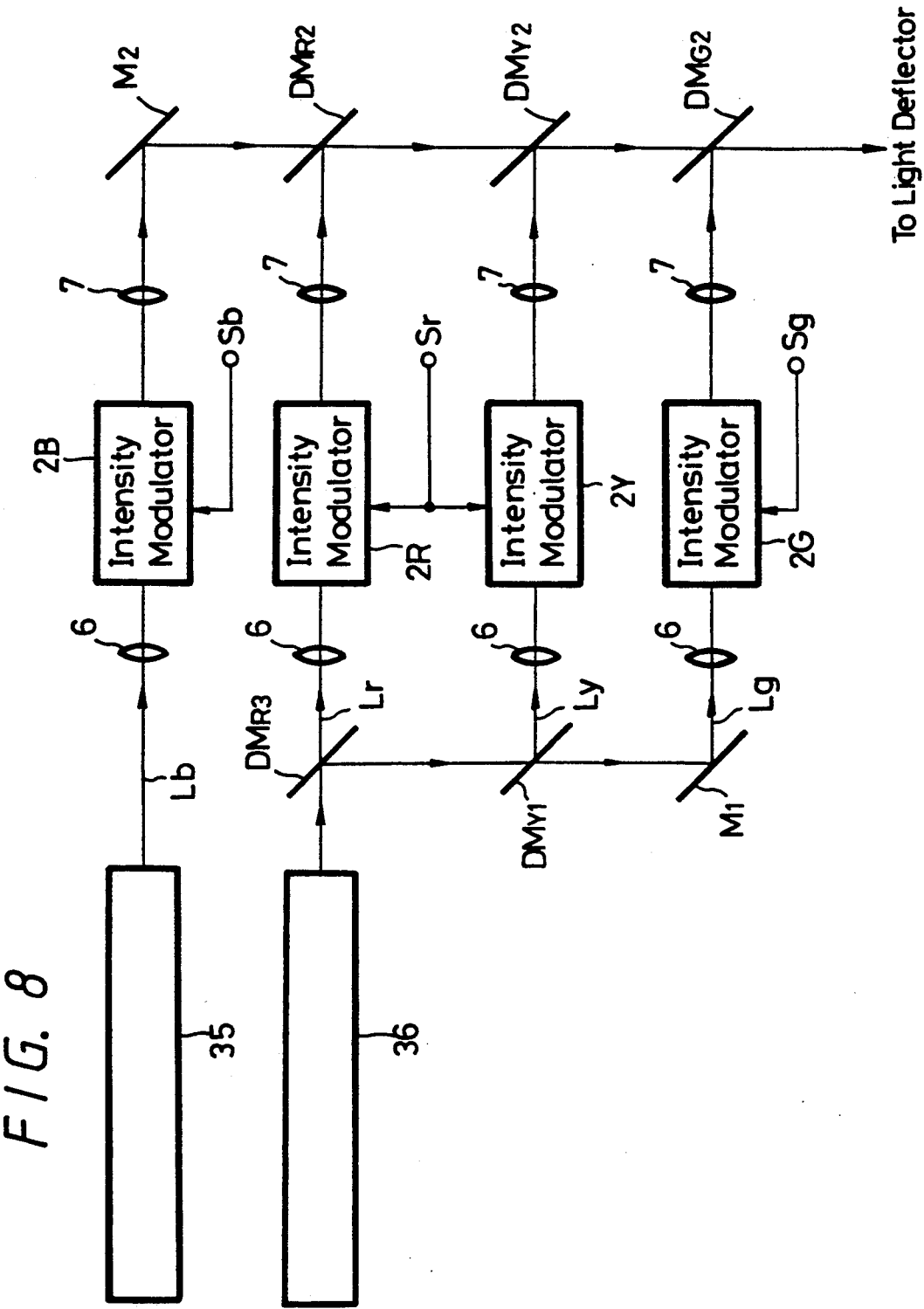
FIG. 8 is a schematic plan view of a laser beam color image display apparatus according to yet another embodiment of the present invention.

FIGS. 6 through 8 show laser beam color image display apparatus according to other embodiments of the present invention. Those parts shown in FIGS. 6 through 8 which correspond to those shown in FIG. 5 are denoted by corresponding reference characters.

The laser beam color image display apparatus, generally designated by 34 in FIG. 6, has three laser beam sources, i.e., an argon gas laser beam source 31, a krypton gas laser beam source 32, and an argon gas laser beam source 33. The argon gas laser beam source 31 emits blue laser beams Lb having respective wavelengths of 476.5 nm and 457.9 nm. The argon gas laser beam source 33 emits a green laser beam Lg having a wavelength of 514.5 nm. The blue and green laser beams Lb, Lg thus emitted are supplied to respective intensity modulators 2B, 2G, and modulated in intensity with blue and green signal components Sb, Sg, respectively, of a video signal that are supplied to the intensity modulators 2B, 2G.

The krypton gas laser beam source 32 emits a laser beam which is supplied to a yellow-reflecting dichroic mirror $DM_{Y1}$. The yellow-reflecting dichroic mirror $DM_{Y1}$ separates the laser beam into a red laser beam Lr having a wavelength of 647.1 nm and a yellow laser beam Ly having a wavelength of 568.2 nm. The separated red and yellow laser beams Lr, Ly are supplied through the dichroic mirror $DM_{Y1}$ and a reflecting mirror $M_1$, respectively, to respective intensity modulators 2R, 2Y, and modulated in intensity with a red signal component Sr of the video signal that is supplied to the intensity modulators 2R, 2Y. The intensity-modulated laser beams Lr, Ly are added by way of active mixture, providing the red light of a displayed image. The intensity modulated laser beams are then reflected by a reflecting mirror $M_2$ and dichroic mirrors $DM_{R2}$, $DM_{Y2}$, $DM_{B2}$ to a light deflector. The light deflector, which is composed of a polygon mirror and a galvanometer mirror, and a display screen (not shown in FIG. 6) are identical to those shown in FIG. 5.

The laser beam color image display apparatus, generally designated by 37 in FIG. 7, has two laser beam sources, i.e., an argon gas laser beam source 35 and a krypton gas laser beam source 36. The laser beam emitted from the argon gas laser beam source 35 is applied to a blue-reflecting dichroic mirror $DM_{B1}$ which separates the laser beam into blue laser beams Lb having respective wavelengths of 457.9 nm and 476.5 nm and a green laser beam Lg having a wavelength of 514.5 nm. The blue and green laser beams Lb, Lg thus emitted are supplied through the dichroic mirror $DM_{B1}$ and a reflecting mirror $M_3$, respectively, to respective intensity modulators 2B, 2G, and modulated in intensity with blue and green signal components Sb, Sg, respectively, of a video signal that are supplied to the intensity modulators 2B, 2G.

The laser beam emitted from the krypton gas laser beam source 36 is supplied to a yellow-reflecting dichroic mirror $DM_{Y1}$. The yellow-reflecting dichroic mirror $DM_{Y1}$ separates the laser beam into a red laser beam Lr having a wavelength of 647.1 nm and a yellow laser beam Ly having a wavelength of 568.2 nm. The separated red and yellow laser beams Lr, Ly are supplied through the dichroic mirror $DM_{Y1}$ and a reflecting mirror $M_1$, respectively, to respective intensity modulators 2R, 2Y, and modulated in intensity with a red signal component Sr of the video signal that is supplied to the intensity modulators 2R, 2Y. The intensity-modulated laser beams Lr, Ly are added by way of active mixture, providing red light of a displayed image. The intensity modulated laser beams are then reflected by a reflecting mirror $M_2$ and dichroic mirrors $DM_{Y2}$, $DM_{G2}$, $DM_{B2}$ to a light deflector. The light deflector, which is composed of a polygon mirror and a galvanometer mirror, and a display screen (not shown in FIG. 7) are identical to those shown in FIG. 5.

The laser beam color image display apparatus, generally designated by 40 in FIG. 8, has two laser beam sources, i.e., an argon gas laser beam source 35 and a krypton gas laser beam source 36. The argon gas laser beam source 35 supplies blue laser beams Lb having respective wavelengths of 457.9 nm and 476.5 nm to an intensity modulator 2B, and modulated in intensity with a blue signal component Sb of a video signal that is supplied to the intensity modulator 2B.

The laser beam emitted from the krypton gas laser beam source 36 is supplied to a red-passing dichroic mirror $DM_{R3}$. The red-passing dichroic mirror $DM_{R3}$ separates a red laser beam Lr having a wavelength of 647.1 nm from the supplied laser beam. The red laser beam Lr is then supplied to an intensity modulator 2R. The laser beam reflected by the red-passing dichroic mirror $DM_{R3}$ is applied to a yellow-reflecting dichroic mirror $DM_{Y1}$ which separates the laser beam into a yellow laser beam Ly having a wavelength of 568.2 nm and a green laser beam Lg having a wavelength of 520.8 nm. The separated yellow and green laser beams Ly, Lg are supplied through the dichroic mirror $DM_{Y1}$ and a reflecting mirror $M_1$, respectively, to respective intensity modulators 2Y, 2G. The laser beams Lb, Lr, Ly, Lg are then modulated in intensity by the respective intensity modulators 2B, 2R, 2Y, 2G with blue, red, and green signal components Sb, Sr, Sg of a video signal that are supplied to the intensity modulators 2B, 2R, 2Y, 2G. The intensity-modulated laser beams Lr, Ly are added by way of active mixture, providing red light of a displayed image. The intensity modulated laser beams are then reflected by a reflecting mirror $M_2$ and dichroic mirrors $DM_{Y2}$, $DM_{G2}$, $DM_{B2}$ to a light deflector. The light deflector, which is composed of a polygon mirror and a galvanometer mirror, and a display screen (not shown in FIG. 8) are identical to those shown in FIG. 5.

The laser beam color image display apparatus shown in FIGS. 6 through 8 also express the red light of the displayed image by adding the krypton laser beam of the wavelength of 568.2 nm and the krypton laser beam of the wavelength of 647.1 nm by way of active mixture. The luminance of the resulting red light is therefore increased. The laser beam color image display apparatus can display color images with greater luminance, have a lower electric power requirement, require less maintenance, are smaller in size, and less expensive than the conventional laser beam color image display apparatus.

As a consequence, the laser beam color image display apparatus according to the embodiments of the present invention offer various practical advantages make themselves useful in actual applications.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A laser beam color image display apparatus comprising:
  first laser beam generating means for generating a blue laser beam;
  second laser beam generating means for generating a green laser beam;
  third laser beam generating means for generating a red laser beam;
  said third laser beam generating means comprising mixing means for adding a laser beam having a wavelength of 568.2 nm and a laser beam having a wavelength of 647.1 nm by way of active mixture, thereby generating the red laser beam; and
  scanning means for scanning a display screen with said blue laser beam, said green laser beam, and said red laser beam to display a color image on the display screen;
  said third laser beam generating means further comprising first modulating means for modulating the intensity of said laser beam having the wavelength of 568.2 nm with a red signal component of a video signal and second modulating means for modulating the intensity of said laser beam having the wavelength of 647.1 nm with said red signal component.

2. A laser beam color image display apparatus according to claim 1, wherein said mixing means comprises means for adding the laser beam having the wavelength of 568.2 nm and the laser beam having the wavelength of 647.1 nm at an output power ratio of 1:20.

3. A laser beam color image display apparatus according to claim 2, wherein said red laser beam generated by said third laser beam generating means has a wavelength of 612 nm.

4. A laser beam color image display apparatus according to claim 1, wherein said third laser beam generating means comprises an argon-krypton mixed gas laser beam source.

5. A laser beam color image display apparatus according to claim 1, wherein said third laser beam generating means comprises a krypton gas laser beam source.

6. A laser beam color image display apparatus according to claim 1, wherein said first, second, and third laser beam generating means comprise a common laser beam source for emitting a laser beam, and respective dichroic mirrors for separating the last-mentioned laser beam into said blue laser beam, said green laser beam, and said laser beam having the wavelength of 568.2 nm and said laser beam having the wavelength of 647.1 nm.

7. A laser beam color image display apparatus according to claim 1, wherein said first and second laser beam generating means comprise respective laser beam sources for emitting said blue laser beam and said green laser beam, respectively, and wherein said third laser beam generating means comprises a laser beam source for emitting a laser beam and a dichroic mirror for separating the last-mentioned laser beam into said laser beam having the wavelength of 568.2 nm and said laser beam having the wavelength of 647.1 nm.

8. A laser beam color image display apparatus according to claim 1, wherein said first and second laser beam generating means comprise a common laser beam source for emitting a laser beam and a dichroic mirror for separating the last-mentioned laser beam into said blue laser beam and said green laser beam, respectively, and wherein said third laser beam generating means comprises a laser beam source for emitting a laser beam and a dichroic mirror for separating the last-mentioned laser beam into said laser beam having the wavelength of 568.2 nm and said laser beam having the wavelength of 647.1 nm.

9. A laser beam color image display apparatus according to claim 1, wherein said first laser beam generating means comprise a laser beam source for emitting said blue laser beam, and wherein said second and third laser beam generating means comprises a common laser beam source for emitting a laser beam and first dichroic mirrors for separating the last-mentioned laser beam into said green laser beam, said laser beam having the wavelength of 568.2 nm and said laser beam having the wavelength of 647.1 nm.

* * * * *